United States Patent
Xu et al.

(10) Patent No.: US 11,997,063 B2
(45) Date of Patent: May 28, 2024

(54) INTELLIGENT COLLECTION OF MEETING BACKGROUND INFORMATION

(71) Applicant: Citrix Systems, Inc., Fort Lauderdale, FL (US)

(72) Inventors: Ke Xu, Nanjing (CN); Zhipan Liu, Nanjing (CN); Zongpeng Qiao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 277 days.

(21) Appl. No.: 17/245,546

(22) Filed: Apr. 30, 2021

(65) Prior Publication Data

US 2022/0329555 A1    Oct. 13, 2022

Related U.S. Application Data

(63) Continuation of application No. PCT/CN2021/085878, filed on Apr. 8, 2021.

(51) Int. Cl.
*H04L 51/212* (2022.01)
*G06F 40/205* (2020.01)
*G06F 40/289* (2020.01)

(52) U.S. Cl.
CPC .......... *H04L 51/212* (2022.05); *G06F 40/205* (2020.01); *G06F 40/289* (2020.01)

(58) Field of Classification Search
CPC ............................ H04L 51/212; G06F 40/289
USPC ........................................................ 709/206
See application file for complete search history.

(56) References Cited

U.S. PATENT DOCUMENTS

| | | |
|---|---|---|
| 9,454,524 B1 | 9/2016 | Modani et al. |
| 9,577,966 B1 | 2/2017 | Dorsey et al. |
| 10,817,782 B1 | 10/2020 | Rando |
| 10,873,611 B2 | 12/2020 | Zlatarev |
| 11,095,468 B1 | 8/2021 | Pandey et al. |
| 11,457,057 B2 | 9/2022 | Pathak |
| 11,552,919 B1 | 1/2023 | Shah et al. |
| 11,916,975 B2 | 2/2024 | Liu et al. |

(Continued)

FOREIGN PATENT DOCUMENTS

| | | |
|---|---|---|
| CN | 101155049 A | 4/2008 |
| CN | 102385615 A | 3/2012 |

(Continued)

OTHER PUBLICATIONS

International Search Report and Written Opinion for App. No. PCT/CN2021/085878, dated Jan. 4, 2022, 10 pages.

(Continued)

*Primary Examiner* — Sibte H Bukhari

(57) ABSTRACT

According to some embodiments, a method can include: receiving, by a first computing device, information about a meeting that a user is scheduled to attend; retrieving, by the first computing device, a plurality of messages sent to the user in one or more applications; analyzing, by the first computing device, the plurality of messages to identify one or more messages relevant to the meeting based on contents of the messages and the information received about the meeting; and sending, by the first computing device, the relevant messages to a second computing device, the second computing device configured to display the relevant messages to the user.

18 Claims, 13 Drawing Sheets

(56) References Cited

U.S. PATENT DOCUMENTS

| | | |
|---|---|---|
| 2003/0222765 A1* | 12/2003 | Curbow ............... G06Q 10/109 709/217 |
| 2004/0153456 A1 | 8/2004 | Charnock et al. |
| 2005/0216328 A1 | 9/2005 | Clark |
| 2007/0244879 A1 | 10/2007 | Clausner |
| 2008/0313004 A1 | 12/2008 | Ryan |
| 2012/0001917 A1 | 1/2012 | Doganata et al. |
| 2013/0097491 A1 | 4/2013 | Shoya |
| 2014/0222907 A1 | 8/2014 | Seligmann |
| 2015/0121281 A1 | 4/2015 | Shin et al. |
| 2015/0142800 A1 | 5/2015 | Thapliyal |
| 2015/0169788 A1 | 6/2015 | Doganata et al. |
| 2015/0170092 A1 | 6/2015 | Klein |
| 2015/0220888 A1* | 8/2015 | Iyer ................... G06Q 10/1095 705/7.19 |
| 2016/0329050 A1 | 11/2016 | Godewyn |
| 2017/0078232 A1 | 3/2017 | Faruk et al. |
| 2017/0126755 A1 | 5/2017 | Singh |
| 2017/0278038 A1 | 9/2017 | Wu |
| 2017/0329745 A1 | 11/2017 | Sharifi et al. |
| 2018/0018610 A1 | 1/2018 | Del Balso |
| 2018/0287987 A1 | 10/2018 | Purian |
| 2018/0330013 A1 | 11/2018 | Liden et al. |
| 2019/0258985 A1 | 8/2019 | Daniek |
| 2019/0356709 A1 | 11/2019 | Zlatarev |
| 2020/0145240 A1* | 5/2020 | Jaber ............. G06Q 10/063116 |
| 2020/0257850 A1 | 8/2020 | Carbune et al. |
| 2021/0019713 A1 | 1/2021 | Vangala |
| 2021/0073712 A1 | 3/2021 | Fox |
| 2021/0109744 A1 | 4/2021 | Hegde |
| 2021/0184879 A1 | 6/2021 | Kishore et al. |
| 2021/0224324 A1 | 7/2021 | Fourney et al. |
| 2021/0400142 A1 | 12/2021 | Jorasch |
| 2021/0407499 A1 | 12/2021 | Sun et al. |
| 2022/0014543 A1 | 1/2022 | Jakobsson et al. |
| 2022/0067510 A1 | 3/2022 | Jayakumar et al. |
| 2022/0294752 A1 | 9/2022 | Shelke et al. |
| 2022/0343258 A1 | 10/2022 | Wilde et al. |
| 2022/0385603 A1 | 12/2022 | Aher et al. |
| 2023/0084635 A1 | 3/2023 | Xu et al. |

FOREIGN PATENT DOCUMENTS

| | | |
|---|---|---|
| CN | 102685130 A | 9/2012 |
| CN | 102685227 A | 9/2012 |
| CN | 103186847 A | 7/2013 |
| CN | 103327087 A | 9/2013 |
| CN | 108027738 A | 5/2018 |
| CN | 108391079 A | 8/2018 |
| CN | 109074555 A | 12/2018 |
| CN | 111125086 A | 5/2020 |
| WO | 2013095755 A2 | 6/2013 |

OTHER PUBLICATIONS

International Search Report and Written Opinion issued in App. No. PCT/CN2021/118120, dated Jun. 10, 2022, 9 pages.
International Search Report and Written Opinion issued in App. No. PCT/CN2021/136316, dated Sep. 14, 2022, 10 pages.
International Search Report and Written Opinion issued in App. No. PCT/CN2021/136681, dated Sep. 7, 2022, 9 pages.
International Search Report and Written Opinion issued in App. No. PCT/CN2021/136954, dated Aug. 25, 2022, 9 pages.
International Search Report and Written Opinion issued in App. No. PCT/CN2022/070451, dated Oct. 10, 2022, 10 pages.
Non-Final Office Action dated Jul. 7, 2023 in co-pending U.S. Appl. No. 17/664,297, filed May 20, 2022. Pending U.S. Appl. No. 17/664,297 and the present application is owned by the same applicant.
Non-Final Office Action dated Jul. 25, 2023 in U.S. Appl. No. 17/512,735 filed Oct. 28, 2021. U.S. Appl. No. 17/512,735 and the present application is owned by the same applicant.

* cited by examiner

INTELLIGENT COLLECTION OF MEETING BACKGROUND INFORMATION

CROSS REFERENCE TO RELATED APPLICATION

This application is a continuation of and claims the benefit of PCT Patent Application No. PCT/CN2021/085878 filed on Apr. 8, 2021 in the English language in the State Intellectual Property Office and designating the United States, the contents of which are hereby incorporated herein by reference in its entirety.

BACKGROUND

Organizations schedule meetings for a variety of reasons. For example, within a company, employees within the same division may invited to and/or required to attend monthly planning meetings, weekly "check in" meetings, etc. In addition to regularly scheduled meetings, employees or other persons associated with an organization ("associates") may be invited to stand-alone meetings to discuss time-sensitive matters. It is not uncommon for an employee to attend several meetings in the same day. An organization may use a calendaring service, such as EXCHANGE, to coordinate meeting information among its associates. The associates of the organization may use a compatible calendar application, such as OUTLOOK, to view and manage meetings they are schedule to attend.

SUMMARY

It is appreciated herein that preparing for a meeting can be time consuming. For example, prior to a meeting, background information related to the meeting may be shared among the meeting's invitees using various services and applications, such as email, SLACK, JIRA, TWITTER, DROPBOX, etc. To prepare for a meeting, it may be necessary for an invitee to search/scan through a large number of messages and related materials (e.g., documents) across multiple different applications to find relevant meeting background information.

The present disclosure relates to systems and methods for automatically collecting meeting background information using machine intelligence, and presenting this information to users in an organized, accessible manner, thereby reducing meeting preparation time. The meeting background information can be automatically collected from various data sources and analyzed to determine which information is most relevant to a particular meeting. The most relevant information can be presented to a user, and the user can dynamically adjust certain parameters to improve the relevancy of the background information presented for the meeting. The techniques described herein can be used to improve the efficiency and utility of existing computer systems and applications, such as existing calendaring applications (e.g., OUTLOOK) and existing resource access applications (e.g., CITRIX WORKSPACE).

According to one aspect of the disclosure, a method includes: receiving, by a first computing device, information about a meeting that a user is scheduled to attend; retrieving, by the first computing device, a plurality of messages sent to the user in one or more applications; analyzing, by the first computing device, the plurality of messages to identify one or more messages relevant to the meeting based on contents of the messages and the information received about the meeting; and sending, by the first computing device, the relevant messages to a second computing device, the second computing device configured to display the relevant messages to the user.

In some embodiments, receiving the information about the meeting may include receiving at least a title of the meeting from a calendaring service. In some embodiments, the method may include receiving a request for background information about the meeting, the request sent by the second computing device in response to a user input. In some embodiments, the method may include grouping the plurality of messages into a group of unread messages and a group of read messages, wherein analyzing the plurality of messages to identify the relevant messages includes: analyzing the group of unread messages to identify one or more unread messages relevant to the meeting, and analyzing the group of read messages to identify one or more read messages relevant to the meeting; and wherein the second computing device is configured to separately display the unread messages relevant to the meeting and the read messages relevant to the meeting.

In some embodiments, the method can include: extracting a one or more keywords from the information about the meeting; and receiving trained word vectors for the one or more keywords, wherein analyzing the plurality of messages to identify the relevant messages includes: for ones of the plurality of messages: generating a sentence vector based on contents of the message, calculating a similarity between the sentence vector and the trained word vectors; and identifying the one or more messages relevant to the meeting based on the calculated similarities. In some embodiments, calculating the similarity between the sentence vector and the trained word vectors can include calculating a cosine similarity. In some embodiments, the method can include: receiving one or more weights corresponding to the one or more keywords, wherein analyzing the plurality of messages to identify the relevant messages includes, for ones of the plurality of messages, calculating a relevancy score as a weighted sum of the calculated similarities using the one or more weights. In some embodiments, the one or more weights are received from the second computing device in response to an input. In some embodiments, the one or more applications include at least two of: an email application; a collaboration application; a product management application; and a social application.

According to another aspect of the disclosure, a system includes: a processor and a non-volatile memory storing computer program code. The computer program code, when executed on the processor, causes the processor to execute a process operable to: receive information about a meeting that a user is scheduled to attend; retrieve a plurality of messages sent to the user in one or more applications; analyze the plurality of messages to identify one or more messages relevant to the meeting based on contents of the messages and the information received about the meeting; and send the relevant messages to another computing device, the another computing device configured to display the relevant messages to the user.

In some embodiments, receiving the information about the meeting can include receiving at least a title of the meeting from a calendaring service. In some embodiments, the process may be further operable to receive a request for background information about the meeting, the request sent by the another computing device in response to a user input. In some embodiments, the process may be further operable to group the plurality of messages sent to the user into a group of unread messages and a group of read messages, wherein analyzing the plurality of messages to identify the relevant messages includes: analyzing the group of unread messages to identify one or more unread messages relevant to the meeting, and analyzing the group of read messages to identify one or more read messages relevant to the meeting; and wherein the another computing device is configured to separately display the unread messages relevant to the meeting and the read messages relevant to the meeting.

In some embodiments, the process can be further operable to: extract a one or more keywords from the information about the meeting; and receive trained word vectors for the one or more keywords, wherein analyzing the plurality of messages to identify the relevant messages includes: for ones of the plurality of messages: generating a sentence vector based on contents of the message, calculating a similarity between the sentence vector and the trained word vectors; and identifying the one or more messages relevant to the meeting based on the calculated similarities. In some embodiments, calculating the similarity between the sentence vector and the trained word vectors can include calculating a cosine similarity. In some embodiments, the process may be further operable to: receive one or more weights corresponding to the one or more keywords, wherein analyzing the plurality of messages to identify the relevant messages includes, for ones of the plurality of messages, calculating a relevancy score as a weighted sum of the calculated similarities using the one or more weights. In some embodiments, the one or more weights are received from the another computing device in response to an input. In some embodiments, the one or more applications include at least two of: an email application; a collaboration application; a product management application; and a social application.

According to another aspect of the disclosure, a non-transitory computer readable medium stores program instructions that are executable to: receive, by a first computing device, information about a meeting that a user is scheduled to attend; retrieve, by the first computing device, a plurality of messages sent to the user in one or more applications; analyze, by the first computing device, the plurality of messages to identify one or more messages relevant to the meeting based on contents of the messages and the information received about the meeting; and send, by the first computing device, the relevant messages to a second computing device, the second computing device configured to display the relevant messages to the user.

In some embodiments, the program instructions may be further executable to group the plurality of messages into a group of unread messages and a group of read messages, wherein analyzing the plurality of messages to identify the relevant messages includes: analyzing the group of unread messages to identify one or more unread messages relevant to the meeting, and analyzing the group of read messages to identify one or more read messages relevant to the meeting; and wherein the second computing device is configured to separately display the unread messages relevant to the meeting and the read messages relevant to the meeting.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
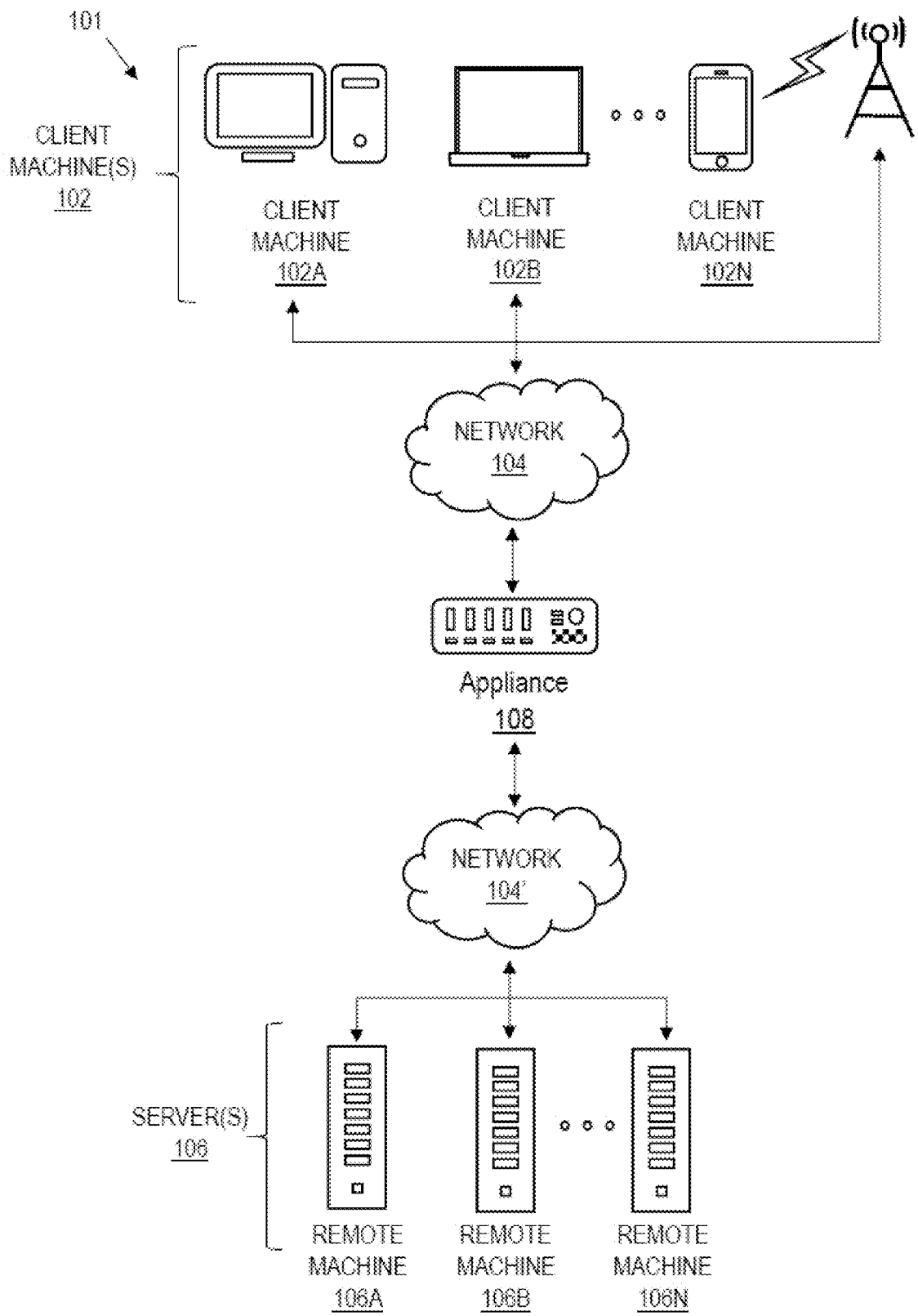
FIG. 1 is a diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
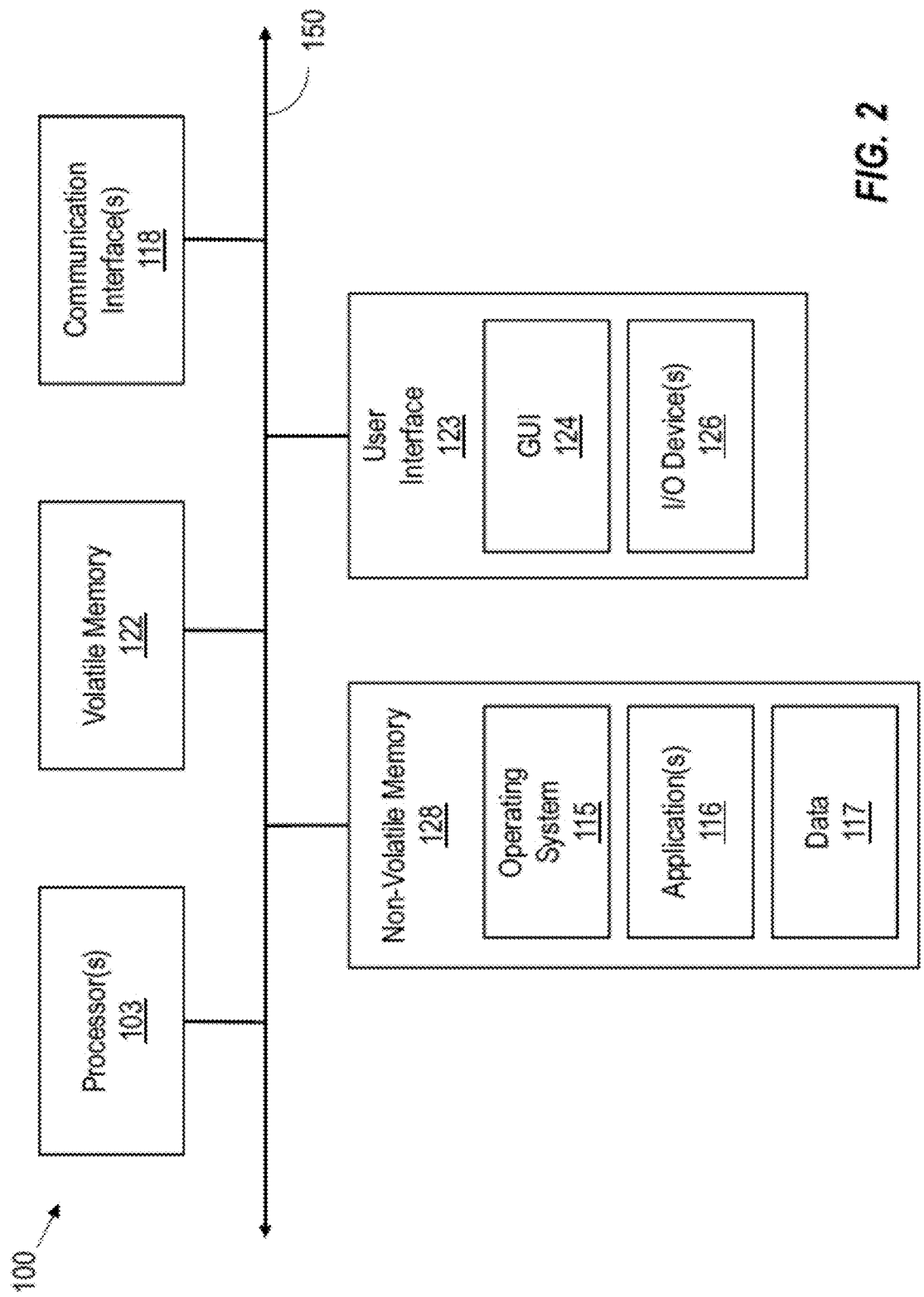
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
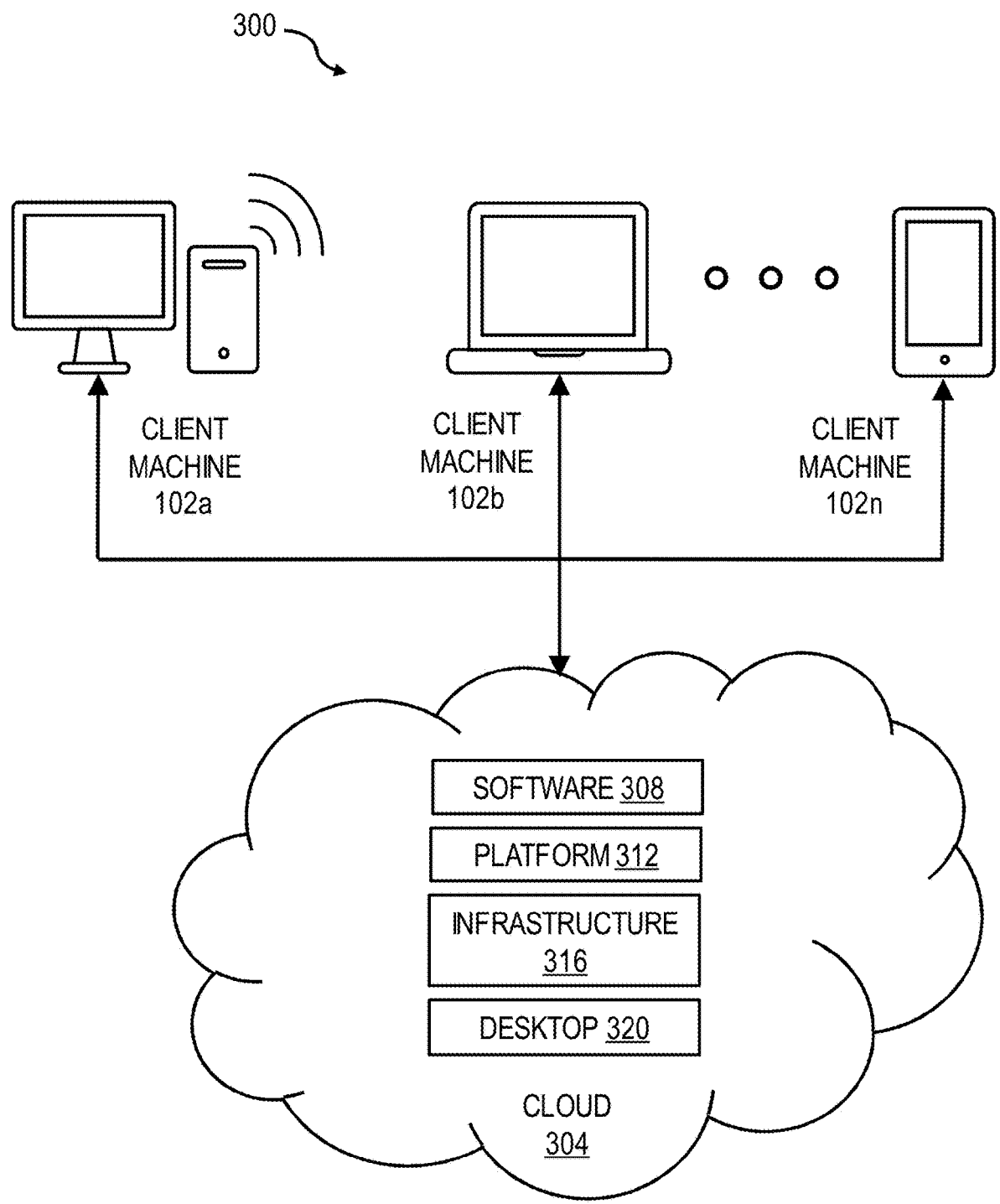
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
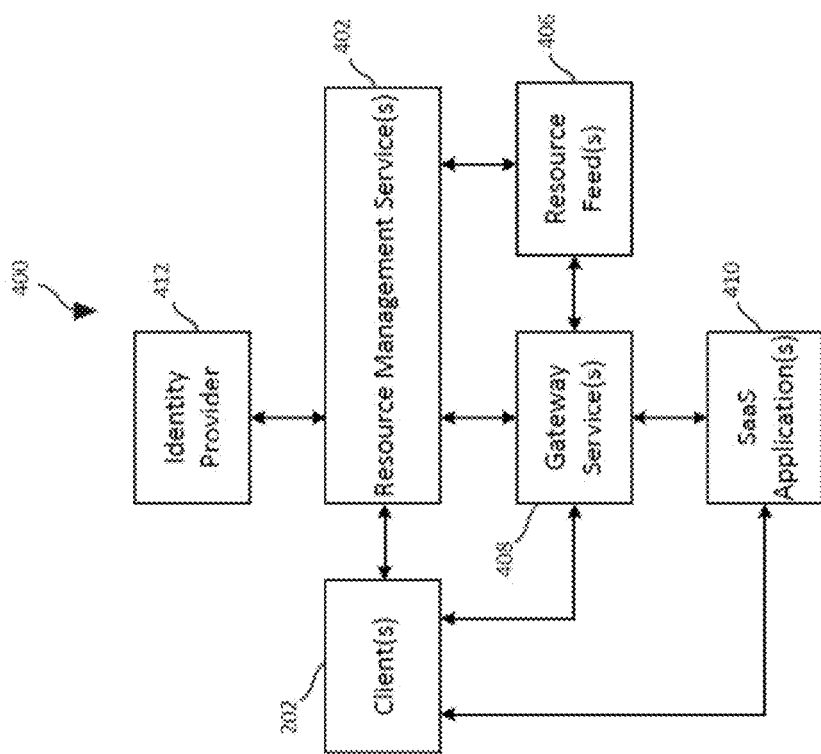
FIG. 4A is a block diagram of an example system in which resource management services may manage and streamline access by clients to resource feeds (via one or more gateway services) and/or software-as-a-service (SaaS) applications.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
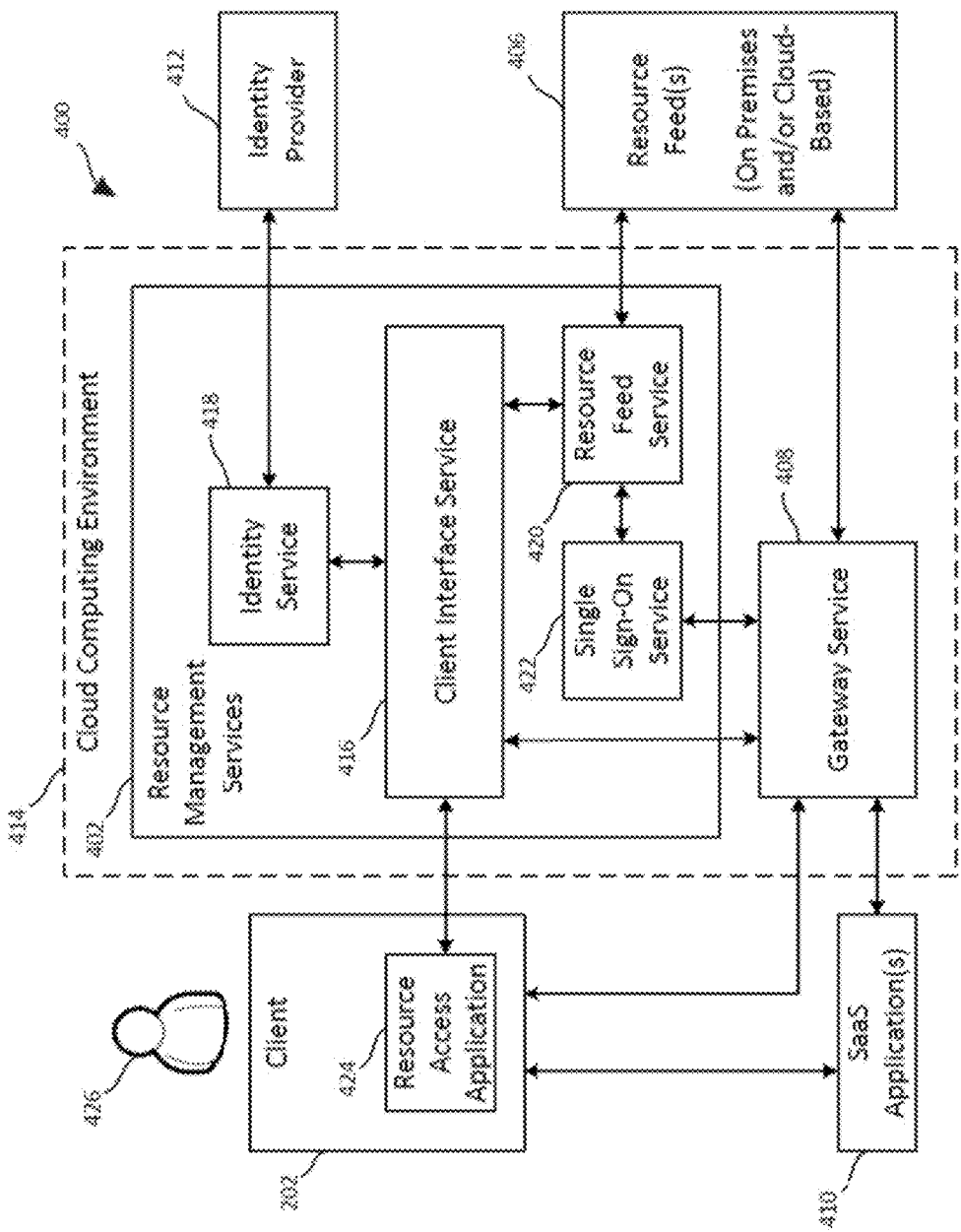
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
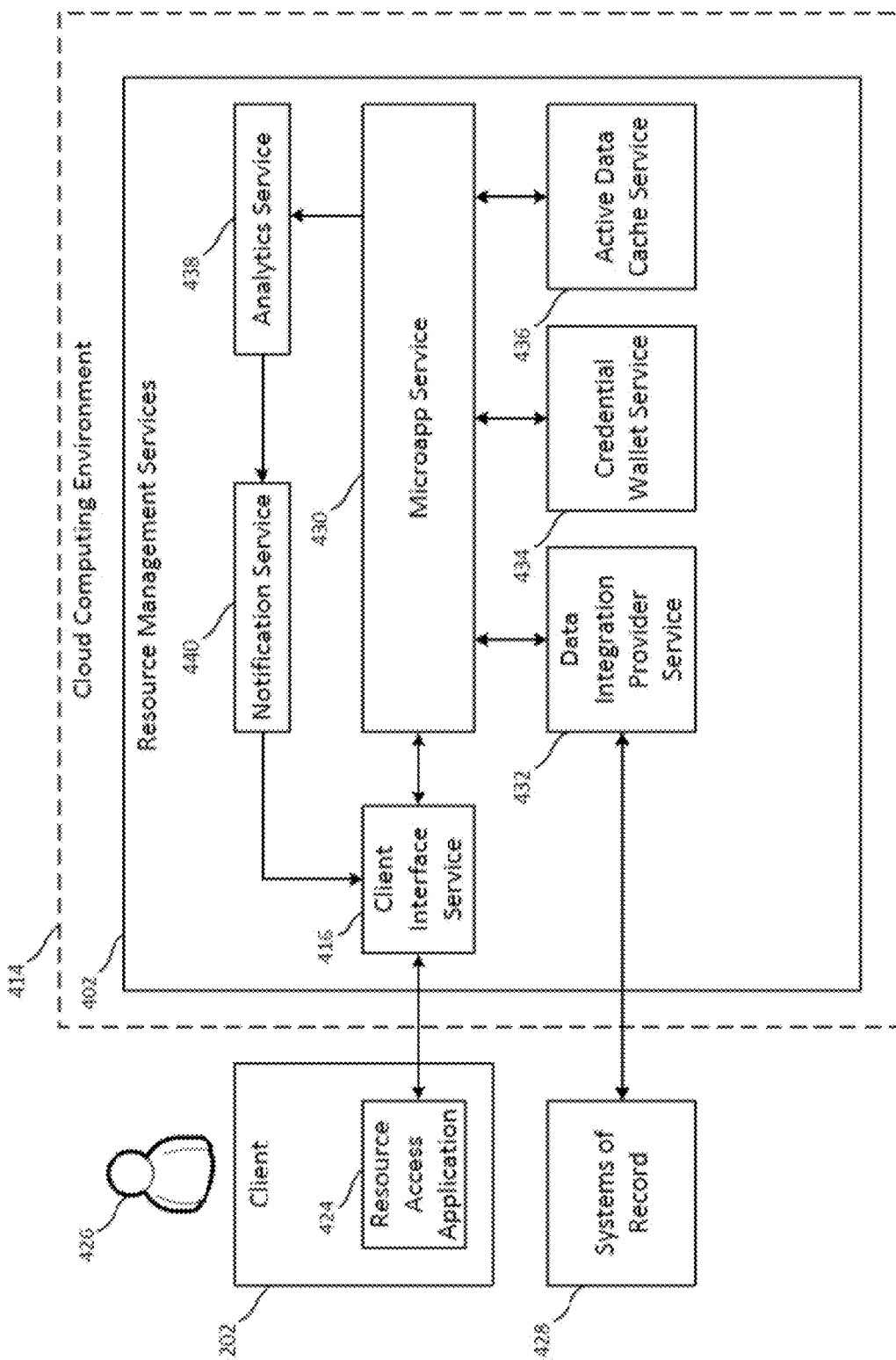
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424

(via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information being sought.

Figure 5:
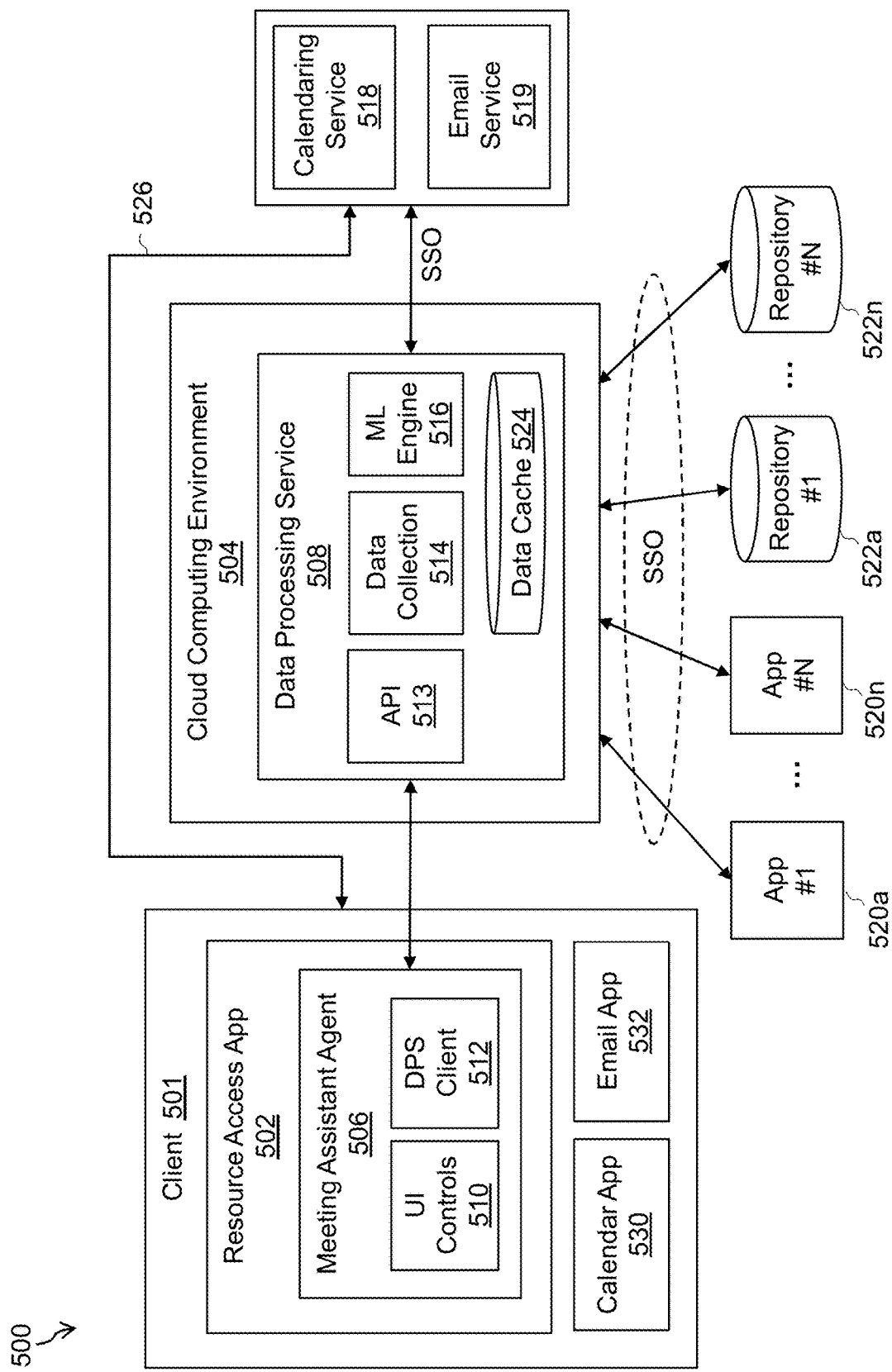
FIG. 5 is block diagram of a system for intelligent collection of meeting information, according to some embodiments.

FIG. 5 shows a system for intelligent collection of meeting information, according to some embodiments. Illustrative system 500 includes a resource access application 502 installed on a client 501 and configured to communicate with a cloud computing environment 504. Client 501, resource access application 502, and cloud computing environment 504 of FIG. 5 can be the same as or similar to client 202, resource access application 424, and cloud computing environment 414, respectively, of FIGS. 4A-4C.

A meeting assistant agent 506 can be provided as a sub-module or other component of resource access application 502. A data processing service 508 can be provided as a service (e.g., a microservice) within the cloud clouding environment 504. Meeting assistant agent 506 and data processing service 508 can interoperate to automatically collect and present meeting background information to a user of the resource access app 502. To promote clarity in the drawings, FIG. 5 shows a single resource access application 502 connected to data processing service 508. However, embodiments of data processing service 508 can be used to service many resource access applications 502 used by many different users associated with one or more organizations. Meeting assistant agent 506 and/or data processing service 508 may be implemented as computer instructions executable to perform the corresponding functions disclosed herein. Meeting assistant agent 506 and data processing service 508 can be logically and/or physically organized into one or more components. In the example of FIG. 5, meeting assistant agent 506 includes UI controls 510 and a data processing service (DPS) client 512. Also, in this example, data processing service 508 includes an application programming interface (API) module 513, a data collection module 514, and a machine learning (ML) engine 516.

The client-side meeting assistant agent 506 and cloud-side data processing service 508 can communicate using an API. For example, meeting assistant agent 506 can utilize DPS client 512 to send API requests (or "messages") to data processing service 508 wherein the API requests are received and processed by API module 513. Likewise, data processing service 508 can utilize API module 513 to send API responses/messages to meeting assistant agent 506 wherein the API responses are received and processed by DPS client 512. In some embodiments, data processing service 508 can push data to one or more clients 501. For example, data processing service 508 may automatically collect meeting background information for a particular user and push that information to a corresponding client 501 where it can be stored for later use (i.e., meeting background information can be "pre-loaded" or "pre-cached" onto clients 501 in some embodiments).

In addition to resource access application 502, various other applications can be installed on client 501, such as a calendar application 530 and email application 532. The calendar application 530 and email application 532 can communicate with a calendaring service 518 and an email service 519, respectively, as illustrated by line 526. In some embodiments, calendar application 530 and email application 532 can correspond to a single application (e.g., OUTLOOK) that provides both calendaring and email functionality to a user of the client 501.

Referring to data processing service 508, data collection module 514 is operable to retrieve information about scheduled meetings from one or more calendaring services (e.g., calendaring service 518) along with meeting background information from one or more other data sources. The other data sources can include, for example, one or more email services (e.g., email service 519), one or more applications 520a . . . 520n (520 generally), and one or more repositories 522a . . . 522n (522 generally). In some embodiments, calendaring service 518 an email service 519 may correspond to a common system/service that provides both calendaring and email services, such as EXCHANGE. In other embodiments, calendaring service 518 an email service 519 may correspond to separate systems/services. Applications 520 can include various types of applications such as SaaS applications, web applications, and desktop applications. Non-limiting examples of applications 520 that can serve as data sources according the present disclosure include collaboration applications such as SLACK and TEAMS; product/project management applications such as JIRA, BASECAMP, and TRELLO; and social applications such as TWITTER and FACEBOOK. Repositories 522 can include various types of data repositories such as conventional file systems, cloud-based storage services such as DROPBOX and MICROSOFT ONEDRIVE, and web servers that host files, documents, and other materials.

Data collection module 514 may utilize APIs provided by data sources 518, 519, 520, 522 to query/retrieve information therefrom. For example, data collection module 514 may use MICROSOFT GRAPH APIs to access mail, calendars, and contacts in EXCHANGE. As another example, data collection module 514 may use a REST-based API provided by a SaaS application to query/retrieve information therefrom. As yet another example, data collection module 514 may use a file system interface to locate and retrieve files from a file system. As another example, data collection module 514 may use an API to download documents from a cloud-based storage service. A particular data source 518, 519, 520, 522 can be hosted within a cloud computing environment (e.g., cloud computing environment 504 or a different cloud computing environment) or within an on-premises data center (e.g., an on-premises data center of an organization that utilizes data processing service 508).

The particular data sources 518, 519, 520, 522 used by data processing service 508 can vary between different organizations and/or between different users of the same organization. In some embodiments, data processing service 508 can obtain a list of applications and services used by a particular organization and/or user. For example, data processing service 508 may obtain a list of subscribed resources (e.g., applications and services) for a particular user/organization via resource feed service 420 of FIG. 4B. Data processing service 508 may also obtain, for one or more users, authentication credentials (e.g., user ids and passwords, access tokens, etc.) needed to access one of more of the data sources 518, 519, 520, 522. In some embodiments, data processing service 508 may use a single sign-on service (e.g., service 422 of FIG. 4B) to access one or more of the data sources 518, 519, 520, 522.

As mentioned previously, data collection module 514 can retrieve scheduled meeting information from calendaring service 518. Scheduled meeting information can include information for one or more different meetings, such as meeting dates/times, meeting durations, meeting titles and descriptions, the name and/or email address of the meeting organization, the names and/or email addresses of other persons invited to the meeting ("invitees"). etc. This list of scheduled meeting information is merely illustrative and may vary depending on the capabilities of calendaring service 518. Data collection module 514 can retrieve scheduled meeting information for one or more users associated with one or more organizations.

In some embodiments, data collection module 514 can collect scheduled meeting information from calendaring service 518 on a continuous or periodic basis. For example, data collection module 514 can retrieve information about upcoming meetings that are scheduled to start within a given time period. Such information is referred to herein as "upcoming meeting information" and the corresponding time period is referred to as the "upcoming meeting window." For example, the upcoming meeting window can be defined as meetings that are scheduled to start within the next 3 hours, 6 hours, 12 hours, 24 hours, 2 days, 7 days, 30 days, etc. The upcoming meeting window can vary for different organizations and/or different users (e.g., it can be configured as an organizational policy or a user preference). In other embodiments, data collection module 514 can retrieve scheduled meeting information from calendaring service 518 in response to an input. For example, a user of resource access application 502 may click/tap on a meeting displayed in a calendar view and, in response, meeting assistant agent 506 may send a message to data processing service 508 that causes data collection module 514 to retrieve information about that meeting from calendaring service 518. In still other embodiments, data collection module 514 may not directly retrieve scheduled meeting information from calendaring service 518. Instead, client-side meeting assistant agent 506 may send the meeting information to data processing service 508 within an API request. In any case, data processing service 508 can use the upcoming meeting information to collect background information relevant to one or more meetings. In some embodiments, data collection module 514 can store upcoming meeting information in a data cache 524 that can correspond to, for example, a storage service within cloud computing environment 504.

Data collection module 514 can also retrieves messages and related materials (e.g., documents) from data sources 519, 520, 522. Many different types of applications and services allow users to send and receive messages. For example, users may send and receive messages via email service 519 and various types of applications 520 such as SLACK, TEAMS, JIRA, TWITTER, FACEBOOK, etc. In general, a message can include content, such as text and images, along with metadata such as a timestamp indicating when the message was sent/received, and a read status (or "flag") indicating whether or not the message has been read by the recipient. A message may also include attachments, such as files and documents, or links to such materials. The attached/linked materials may be stored directly within services/applications 519, 520 or within separate data repositories 522.

Data collection module 514 can retrieve messages that were sent/received within a given time period from email service 519 and applications 520. Such messages are referred to herein as "recent messages" and the corresponding time period is referred to herein as the "recent message window." For example, the recent message window can be defined as messages sent/received within the past 12 hours, 24 hours, 2 days, 3 days, 5 days, 7 days, 30 days, etc. The recent message window can vary for different organizations and/or different users (e.g., it can be configured as an organizational policy or a user preference). Data collection module 514 can query for recent messages using APIs provided by email service 519 and applications 520. After retrieving a message from email service 519 or an application 520, data collection module 514 can scan, parse, or otherwise analyze the message to identify attachments, links, or other related materials. If any such related materials are found, data collection module 514 can download or otherwise those materials from data repositories 522. In some embodiments, data collection module 514 can store recent messages and related materials in data cache 524. In some embodiments, the number of recent messages retrieved may be limited to reduce storage and/or processing resources (e.g., at most M recent messages may be retrieved and stored, where M is configurable per-organization or per-user).

ML engine 516 can utilize upcoming meeting information and recent messages retrieved by data collection module 514 to determine which recent messages and related materials are relevant to which upcoming meetings (i.e., to identify relevant meeting background information). In some embodiments, for a particular meeting, ML engine 516 can utilize one or more ML algorithms to extract keywords from the corresponding scheduled meeting information (e.g., from the meeting's title, description, etc.) and to calculate how relevant each recent message is to the meeting using the extracted keywords. The keywords of a particular meeting may be extracted in an intelligent fashion such that the keywords correspond to relevant topics of the meeting rather than simply a list of words found the meeting's title. In some embodiments, weights can be associated with the extracted keywords and ML engine 516 can use these weights to calculate the relevancy scores. The keyword weights can initially be set to default values and then adjusted by the user. For example, if K keywords are extracted from the title of a particular meeting, each keyword may be assigned a default weight of 1/K. In response to the user adjusting keyword weights, ML engine 516 can re-calculate relevancy scores for the recent messages and related materials using the adjusted weights.

The relevant meeting background information identified by ML engine 516 can be sent to meeting assistant agent 506 and presented to the user, such as using the illustrative UI described below in the context of FIGS. 6A-6C. In some embodiments, ML engine 516 can sort (i.e., order) the messages based on calculated relevancy scores and the top N (e.g., N=2) most relevant messages can be sent to meeting assistant agent 506. The value of N may be configurable by the organization and/or the user. In some embodiments, the value of N may be a parameter of an API request sent from meeting assistant agent 506 to data processing service 508 such it can be dynamically adjusted by the user.

In some embodiments, ML engine 516 can group the user's recent messages based on their read statuses. For example, ML engine 516 can separate the recent messages into a group of unread messages and a group of read messages. Each group can be separately analyzed and processed by ML engine 516. For example, the unread messages may be scored and sorted by relevancy and the read messages can separately be scored and sorted by relevancy. The top N messages in each group can be sent to meeting assistant agent 506.

Further description of the ML algorithms and other processing that can be implemented within ML engine 516 is provided below in the context of FIGS. 8 and 9.

In some embodiments, ML engine 516 can store relevant meeting background information in data cache 524, where it can subsequently be retrieved and sent to meeting assistant agent 506 (e.g., in response to a user click/tap, to resource access application 520 launching, or to another input or event).

In some embodiments, some or all of the processing described for data processing service 508 can be implemented within resource access application 502. For example, data collection module 514 and/or ML engine 516 can be implemented as sub-modules of resource access application 502 and configured to execute on client 501 (rather than within cloud computing environment 504).

Meeting assistant agent 506 can includes various UI controls 510 that enable a user to easily access background information for upcoming meetings. For example, UI controls 510 can include controls that a user can click/tap to request meeting background information for a particular meeting. In response to the user's input, meeting assistant agent 506 can send a message to data processing service 508 requesting background information for that meeting. As another example, UI controls 510 can include a popup form to display a set of keywords extracted from scheduled meeting information along with UI controls (e.g., text boxes) via which a user can enter weights the keywords. In response to the user adjusting keyword weights, meeting assistant agent 506 can send another message to data processing service 508 requesting updated meeting background information based on the adjusted weights. These and other examples of UI controls 510 that can be provided by meeting assistant agent 506 are shown and described below in the context of FIGS. 6A-6C.

In the embodiment of FIG. 5, meeting assistant agent 506 is shown as a component of a resource access application 502. Thus, for example, UI controls 510 for collecting and presenting meeting background information may be accessed within the resource access application 502. In other embodiments, meeting assistant agent 506 may be implemented as a plug-in or extension to a calendar application 530, such as OUTLOOK. Here, UI controls 510 may be accessed within the calendar application 530.

Figure 6A:
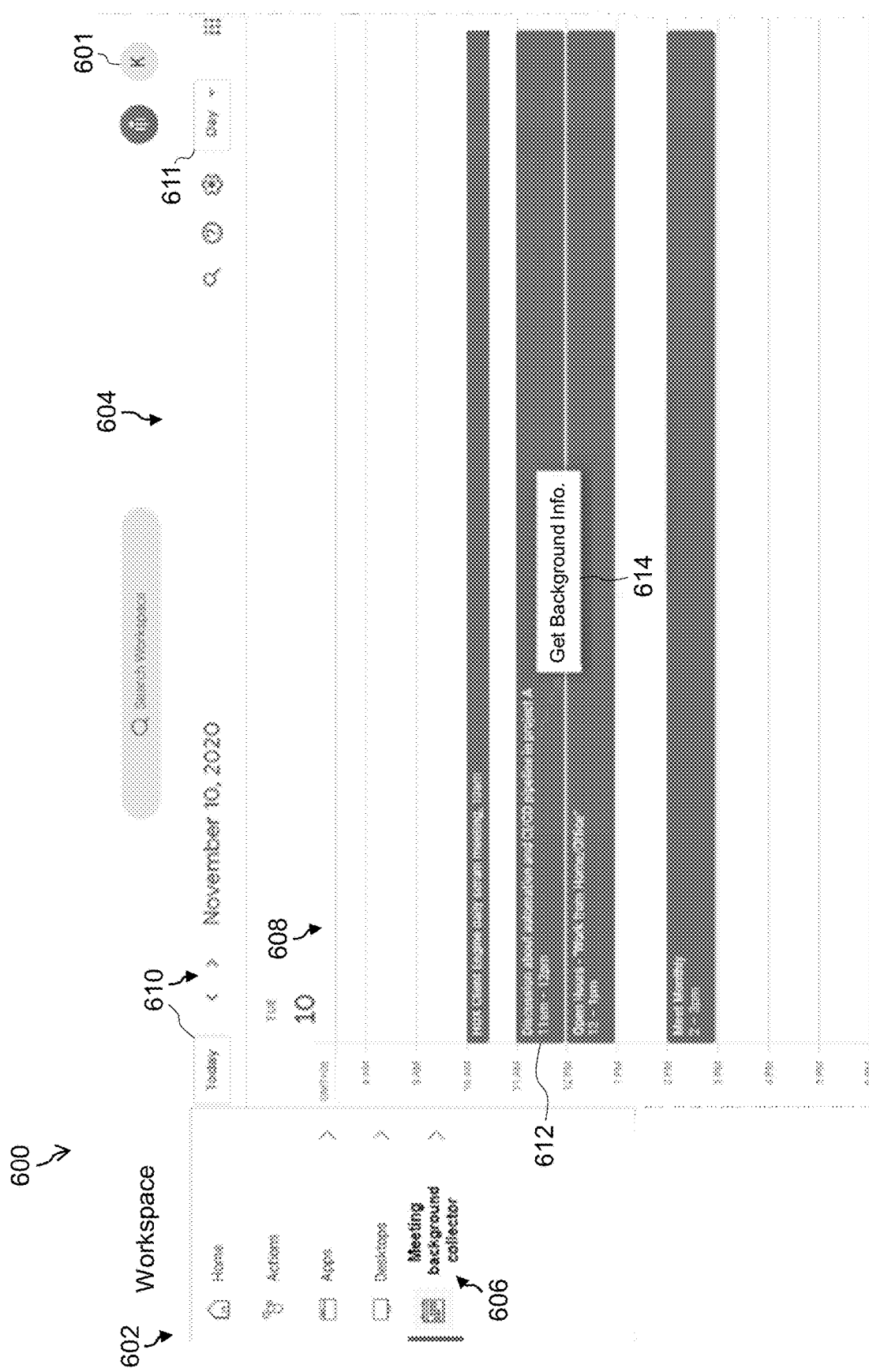
FIGS. 6A-6C are pictorial diagrams showing an example of user interface (UI) that can used to present meeting background information to a user, according to some embodiments.
Figure 6B:
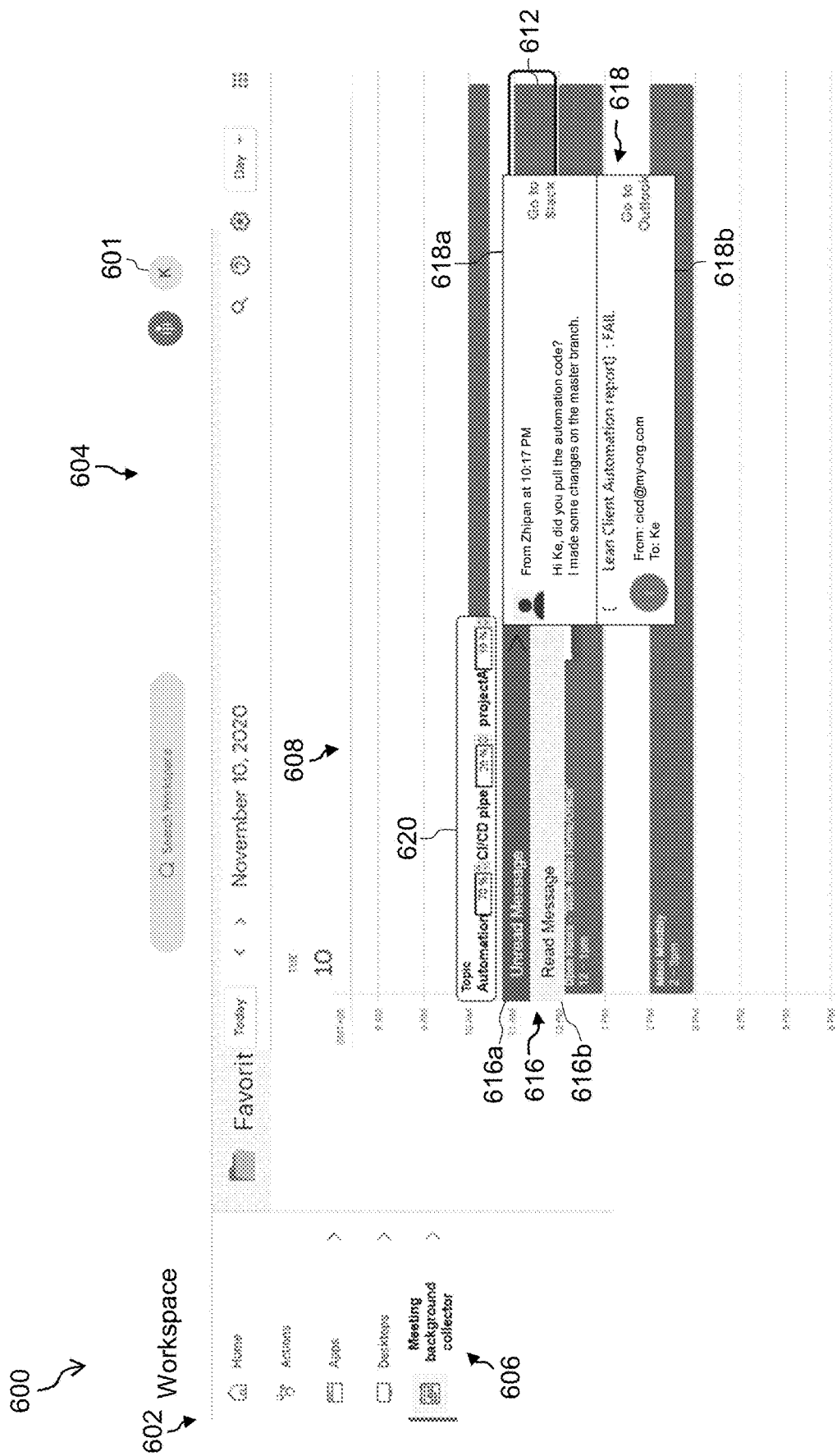
Figure 6C:
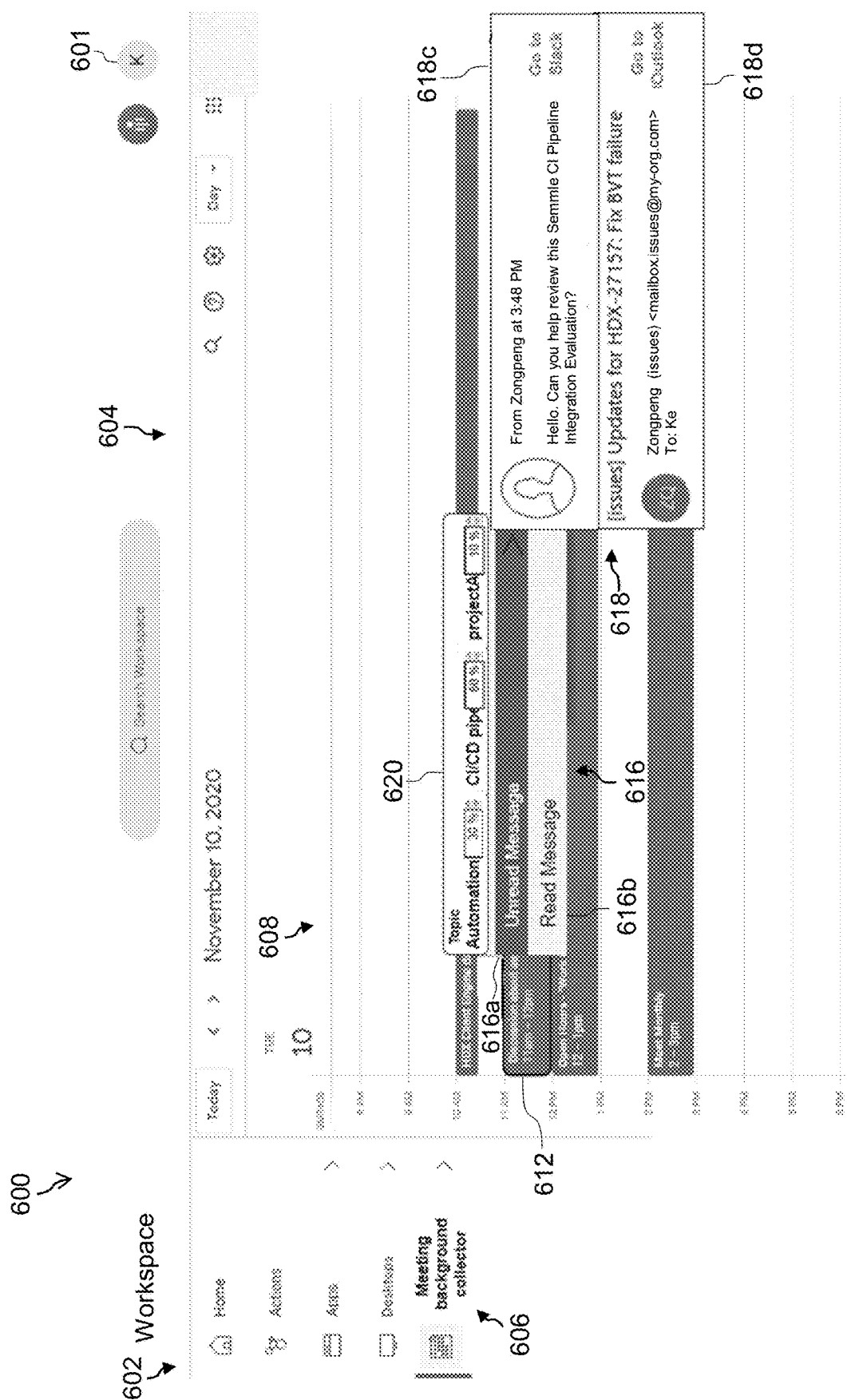

FIGS. 6A-6C show an example of a UI that may be used to present meeting background information, according to some embodiments. An illustrative UI 600 may be implemented within a resource access application, such as resource access application 502 of FIG. 5. In the example of FIGS. 6A-6C and in the following description thereof, it is assumed that a user named "Ke" is logged into the resource access application, as indicated by icon 601.

Referring to FIG. 6A, the illustrative UI 600 can include a navigation pane 602 and a display pane 604. The content of display pane 604 changes depending on which item (or "tab") is selected in the navigation pane 602. Navigation pane 602 can include one or more tabs found in existing resource access applications (e.g., "Home," "Actions," "Apps," and "Desktops") along with a new meeting background collector tab 606 disclosed herein. As shown in FIG. 6A, when meeting background collector tab 606 is selected, display pane 604 may display a calendar view 608, UI controls 610 to select a date, and a UI control 611 (e.g., a drop down menu) to select a timeframe (e.g., day, week, month). Controls 610 and 611 can be used in conjunction with each other to select a time period (e.g., today, tomorrow, the current week, next week, the current month, next month, etc.) for the calendar view 608.

Calendar view 608 displays meetings that user 601 is scheduled to attend within the within the selected time period. In the example of FIG. 6A, user 601 is scheduled to attend to four meetings on Nov. 10, 2020 including a meeting 612 entitled "Discussion about automation and CI/CD pipeline in project A" that is scheduled to start at 11:00 AM. The meetings are represented as rectangular boxes which a user can interact with. For example, in response to the user clicking (e.g., right-clicking) or tapping on the box corresponding to meeting 612, the UI 600 can display a popup button 614 for requesting background information for that meeting. The UI 600 can retrieve the meeting information displayed within calendar view 608 from a calendaring service, such as calendaring service 518 of FIG. 5, or from a calendaring application, such as calendaring application 530 of FIG. 5.

In response to user clicking/tapping popup button 614, UI 600 can cause an API request to be sent a data processing service (e.g., data processing service 508 of FIG. 5) to retrieve background information for the meeting. In some embodiments, the API request can include a unique identifier of the meeting which the data processing service can use to obtain the scheduled meeting information (e.g., the title, description, etc.) from a calendaring service (e.g., calendaring service 518). In other embodiments, the client can send the scheduled meeting information to the data processing service as part of the API request such that the data processing service does not need to retrieve scheduled meeting information from the calendaring service. Other information/parameters can be included in the API request as described herein. The data processing service can collect recent messages associated with user 601 from one or more data sources, and then analyze the collected messages using ML techniques to identify meeting background information (e.g., relevant messages and related materials). The data processing service can extract keywords from the scheduled meeting information and utilize the extracted keywords to identify relevant background information. The data processing service may assign default weights to the extracted keywords and, subsequently, the weights may be dynamically adjusted by the user 601. The data processing service can transmit the meeting background information to the resource access application. In some embodiments, the meeting background information may be retrieved from a data cache used by the data processing service, such as data cache 524 of FIG. 5, or a data cache on the client. In either case, the meeting background information is received or otherwise made available to UI 600.

Turning to FIG. 6B, in response to meeting background information being received, UI 600 can display a popup menu 616 having one or more menu items for viewing the meeting background information. In more detail, a user can utilize popup menu 616 to view messages and related materials that were collected by the data processing service from various data sources (e.g., data sources 519, 520, 522 of FIG. 5) and determined to be relevant to the meeting 612. In the example of FIG. 6B, the relevant messages are grouped into unread messages that can be accessed via a first menu item 616*a* and read messages that can be accessed via a second menu item 616*b*.

When a user clicks on, hovers over, or otherwise selects one of the popup menu items 616*a*, 616*b*, the illustrative UI 600 can present a popup list 618 that displays messages within the selected message group. In the example of FIG. 6B, user 601 selects the unread message menu item 616*a* and two unread messages 618*a*, 618*b* are displayed in the popup list 618. A first illustrative message 618*a* was collected from SLACK and a second illustrative message 618*b* was collected from OUTLOOK. Within popup list 618, the messages can be ordered based on relevancy, chronology, and/or other criteria. In some embodiments, the top N (e.g., N=2) most relevant messages are displayed in the popup list 618 or, similarly, in a list of read messages accessed from menu item 616*b*. In addition to displaying the contents of the messages (or at least a portion of the message contents), popup list 618 can provide links to view the message within the SaaS application or other data source where the message was collected from (i.e., to obtain additional details or context for the message). For example, as shown in FIG. 6B, a user can click a "Go to Slack" link on message 618*a* to view that message in SLACK or can click a "Go to Outlook" link on message 618*b* to view that message in OUTLOOK. In some embodiments, UI 600 can also display or provide links to related materials for particular messages.

Also in response to meeting background information being received, UI 600 can present a popup form 620 that displays one or more keywords (or "topics") extracted from the scheduled meeting information for meeting 612, along with one or more corresponding UI controls (e.g., text boxes, sliders, etc.) via which a user can enter weights for individual keywords. In some embodiments, the keyword weights may be entered as percentages and UI 600 may require/validate that the sum of all the keyword weights equals 100%. In the example of FIG. 6B, three keywords, "Automation," "CI/CD pipe," and "project A" with corresponding weights of 70%, 20%, and 10% are displayed within illustrative popup form 620. The keywords displayed for a given meeting can be determined by the data processing service and provided to UI 600 along with the meeting background information. The corresponding weights can initially be set to default values (e.g., equal percentages) and then adjusted by the user.

Turning to FIG. 6C, the user 601 can dynamically adjust the weights of particular keywords to improve the relevance of, or customize, the meeting background information presented by UI 600. In the example of FIG. 6C, user 601 decreases the weight of the keyword "Automation" to 30% and increases the weight of the keyword "CI/CD pipe" to 60% using popup form 620. That is, in this example user 601 may desire to see more meeting background information related to "CI/CD pipe" and less background information related to "Automation." In response to the user adjusting keyword weights, UI 600 can cause another API request to be sent to the data processing service to retrieve updated background information for the meeting. This subsequent API request can include the adjusted keyword weights along with other parameters, such as a unique identifier of meeting 612. The data processing service can apply the adjusted keyword weights to its ML algorithm to identify updated meeting background information that is more relevant to the user 601. In some embodiments, the data processing service can retrieve the user's recent messages from a data cache (e.g., using the unique meeting identifier) rather than having to collect those messages again from external data sources. The updated meting background information can be provided to the UI 600 and displayed to the user. Thus, in response to the user adjusting the keyword weights, the list of unread messages 618 can dynamically change to include messages 618*c* and 618*d*, as shown in FIG. 6C. Likewise, the list of read messages (accessed via second menu item 616*b*) may dynamically update to reflect the adjusted keyword weights.

While FIGS. 6A-6C shows a UI 600 that can be implemented within a resource access application ("Workspace"), various UI controls described above can be implemented within other types of applications, such as within a calendar application (e.g., as a plug-in to OUTLOOK).

Figure 7:
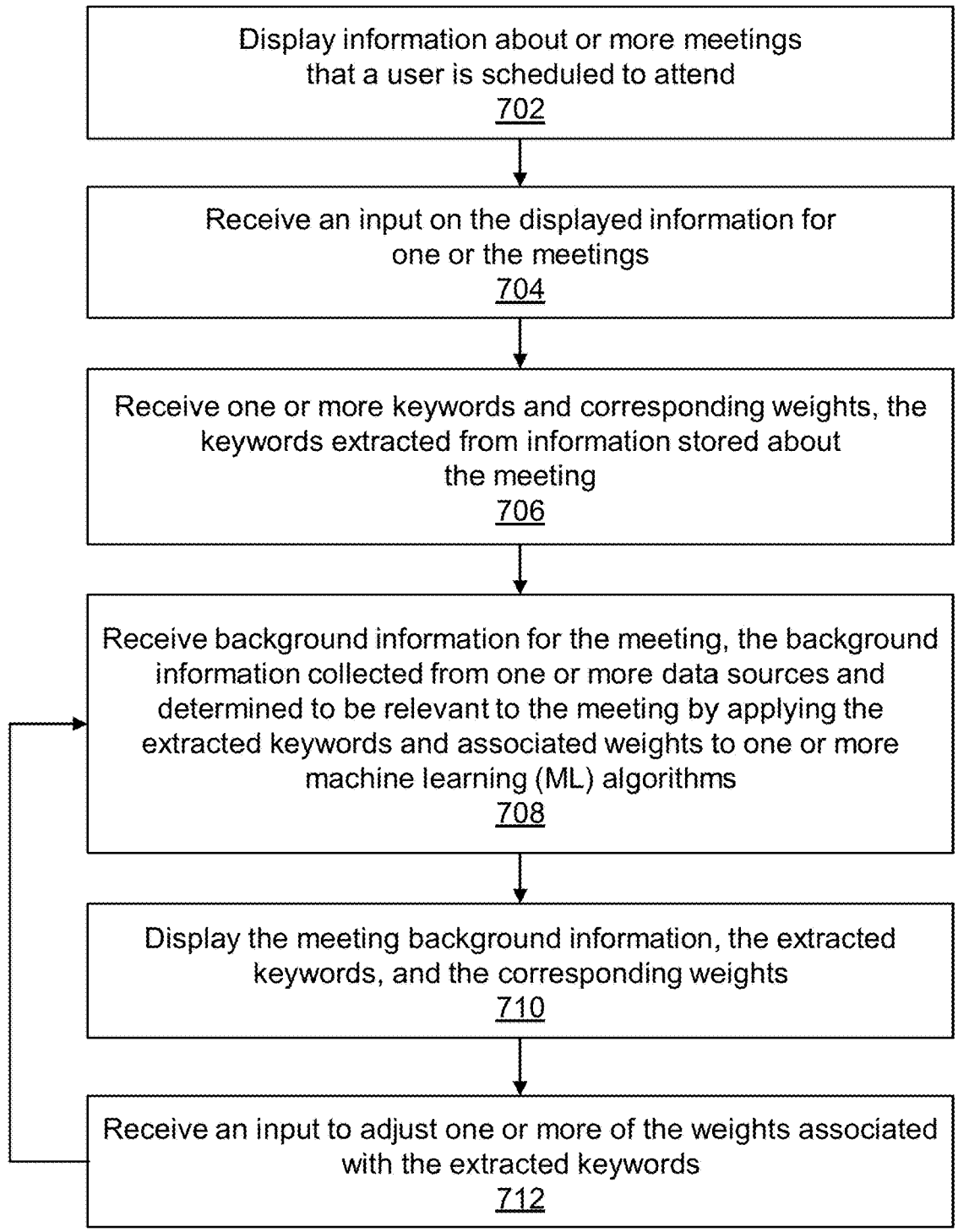
FIGS. 7-9 are flow diagrams showing illustrative processes for intelligent collection of meeting information, according to embodiments of the present disclosure.

FIG. 7 shows an illustrative process 700 for intelligent collection of meeting information that can be implemented, for example, within a meeting assistant agent 506 of FIG. 5. In some embodiments, the meeting assistant agent may be part of a resource access application (e.g., resource access application 502 of FIG. 5).

At block 702, information is displayed about or more meetings that a user is scheduled to attend. The scheduled meeting information can be received from a calendaring service (e.g., calendaring service 518 of FIG. 5) and displayed in a calendar view (e.g., calendar view 608 of FIG. 6A) accessed via a tab within a resource access application (e.g., tab 606 of FIG. 6A).

At block 704, an input is received on the displayed information for one or the meetings. The input can correspond to, for example, a user right-clicking on the meeting information within a calendar view and clicking a button (e.g., button 614 of FIG. 6A) to obtain background information for the meeting. In response to the input, the meeting assistant agent 506 can send an API request to a data processing service (e.g., data processing service 508 of FIG. 5) to request background information for the meeting. In some embodiments, the request can include a unique identifier for the meeting. In some embodiments, the request can include information about the scheduled meeting, such as its title and/or description.

At block 706, one or more keywords and corresponding weights are received, the keywords having been extracted from information stored about the meeting. In some embodiments, the data processing service can retrieve the meeting's title, description, or other information from the calendaring service, and extract the keywords from the retrieved information using techniques described below in the context of FIGS. 8 and 9. The data processing service can assign default weights to each of the keywords, or it can receive user-defined keyword weights. The data processing service can return the keywords and corresponding weights to the meeting assistant agent within an API response.

At block 708, background information is received for the meeting, the background information collected from one or more data sources and determined to be relevant to the meeting by applying the extracted keywords and corresponding weights to one or more machine learning (ML) algorithms. In some embodiments, the data processing service can collect recent messages associated with the user from the data sources and determine which messages are relevant (or most relevant) using the extracted keywords and corresponding weights, as discussed further below in the context of FIGS. 8 and 9. The data processing service can return the meeting background information to the meeting assistant agent as part of the API response. In some embodiments, data processing service can group the user's messages into unread messages and read messages, and send the top N most relevant unread and read messages to the meeting assistant agent.

At block 710, the meeting background information, the extracted keywords, and the corresponding weights are displayed. For example, as illustrated in FIG. 6B, the meeting background information, in the form of unread and read messages, can be displayed in one or more popup lists (e.g., popup list 618) and the keywords and weights can be displayed in a popup form 620.

At block 712, an input is received to adjust one or more of the weights associated with the extracted keywords and processing can repeat from block 708. For example, the input can correspond to a user entering a different weight for one or more of the keywords within the popup form. In response to the keyword weight(s) being adjusted, the meeting assistant agent can send another API request that includes the adjusted keyword weights to the data processing service, and the data processing service can return updated meeting background information based on the adjusted keyword weights (e.g., information that is more relevant to the user). Thus, the illustrative process 700 can repeat from block 708 as shown.

Figure 8:
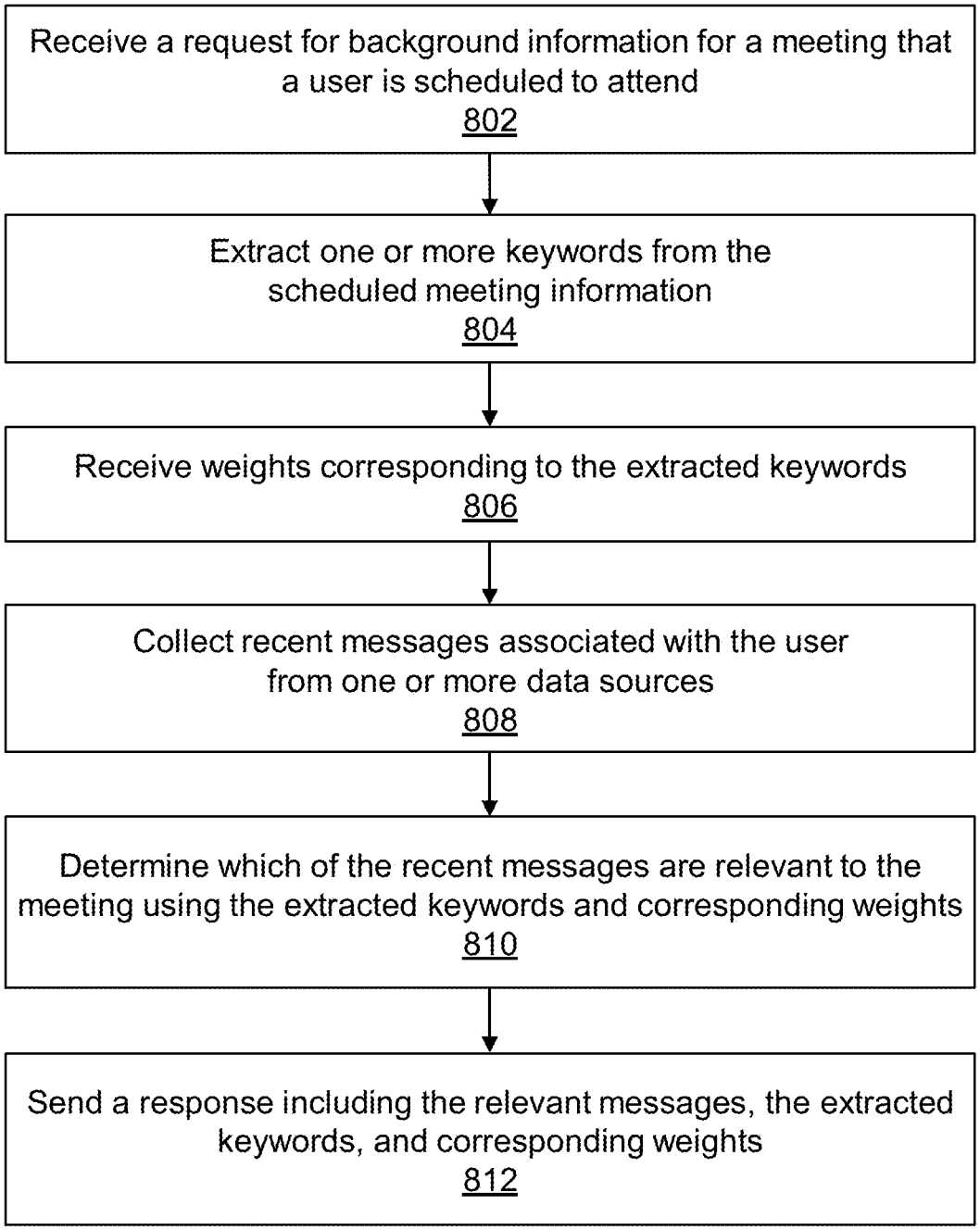

FIG. 8 shows an illustrative process 800 for intelligent collection of meeting information that can be implemented, for example, within a data processing service 508 of FIG. 5.

At block 802, a request is received for background information for a meeting that a user is scheduled to attend. For example, a request may be received from meeting assistant agent 506 of FIG. 5. In some embodiments, the request can include information about the scheduled meeting, such as its title and/or description. In some embodiments, the request can include a unique identifier for the meeting which the data processing service can use to retrieve information about the scheduled meeting from a calendaring service (e.g., calendaring service 518 of FIG. 5).

At block 804, one or more keywords can be extracted from the scheduled meeting information (e.g., the meeting's title and/or description). For the purposes of this discussion, it is assumed that the keywords are extracted from the meeting title "Discuss about automation and CI/CD pipeline in projectA."

In some embodiments, a preliminary list of keywords can be generated by splitting the meeting's title on word boundaries, such as spaces, tabs, and punctuation marks. Thus, for example, the preliminary keywords may be: ["Discuss," "about," "automation," "CI/CD," "pipeline," "in," "projectA"]. The preliminary list of keywords may then be filtered to remove unimportant words (sometimes referred to as "stop words") to produce the extracted keywords (or meeting "topics"). Examples of stop words in English are "a," "the," "is," "are," "in," "about," etc. The data processing service can utilize one or more lists of stop words to filter the preliminary keywords. For example, the data processing service may access a default list of stop words such as that provided by the Natural Language Toolkit (NLTK) or another open-source project. The default stop word list may be selected based on a language or geographic region associated with the user or the user's organization. In addition, the data processing service may access one or more custom lists of stop words that includes additional words that are commonly found in meeting titles or otherwise deemed unimportant for identifying relevant meeting background information. For example, the words "discuss" may be treated as a stop word because it does not provide any information as to a meeting's topic(s). In some embodiments, a particular organization or user can define a custom list of stop words to be used by the data processing service. For example, an organization concerned with project management may define the word "pipeline" as a stop word because it is commonly used jargon within project management. Assuming that the words "discuss," "about," "pipeline," and "in" are treated as stop words, the data processing service can produce the final list of extracted keywords ["automation," "CI/CD," "projectA"] from the meeting title "Discuss about automation and CI/CD pipeline in projectA."

At block 806, weights may be received for the extracted keywords. In some cases, the request received at block 802 can include weights for one or more keywords associated with the meeting. For example, the weights may be entered by a user via a UI (e.g., UI 600 of FIG. 6B) and sent to the data processing service. If the request does not include keyword weights (e.g., this is the first request for background meeting information made during a particular client session), the data processing service can assign default weights to the extracted keywords. For example, if K keywords are extracted from the title of a particular meeting, each keyword may be assigned a default weight of 1/K.

At block 808, recent messages associated with the user are collected from one or more data sources. For example, the data processing service can retrieve emails sent to the user from an email service (e.g., email service 519 of FIG. 5) along with messages sent to the user in JIRA, SLACK, TEAMS, TRELLO, TWITTER, and/or other applications (e.g., applications 520 in FIG. 5). In some embodiments, the data processing service may group the recent messages into unread and read messages. In some embodiments, the messages may be retrieved from a data cache of the data processing service (e.g., data cache 524 of FIG. 5).

At block 810, recent messages that are relevant to the meeting are determined using the extracted keywords and corresponding weights. Briefly, trained word vectors (e.g., 300-dimension word vectors) can be received to each of the extracted keywords. A word vector is a vector of numbers that represent the meaning of a word. The numbers in the word vector represent the word's distributed weight across dimensions. Each dimension can represent a meaning and the word's numerical weight on that dimension captures the closeness of its association with and to that meaning. Thus, the semantics of the word are embedded across the dimensions of the vector. Data processing service can retrieve pre-trained word vectors from third parties (e.g., open source word vectors) or can generate its own trained word vectors, e.g., using the word2vec algorithm. In addition to retrieving/generating word vectors for the keywords ("keyword vectors"), the data processing service can generate a trained sentence vector for each of the recent messages (or "sample vectors"). A relevancy score can then be calculated between each keyword vector and each sample vector. A relevancy score can then be calculated for each message as a weighted sum (using the keyword weights) of the relevancy scores for that message. A more complete description of this process is provided below in the context of FIG. 9.

At block 812, a response is sent including the relevant messages, the extracted keywords, and corresponding weights. In some embodiments, messages can be sorted by their relevancy scores and the top N most relevant messages are sent in the response. In some embodiments, the top N most relevant unread messages and the top N most relevant read messages can be included in the response. The relevant messages, the extracted keywords, and the corresponding weights can be received and displayed by a meeting assistant agent running on a client. In response to a user of the client adjusting the keyword weights, the meeting assistant agent can send another request and the illustrative process 800 can repeat from block 802.

Figure 9:
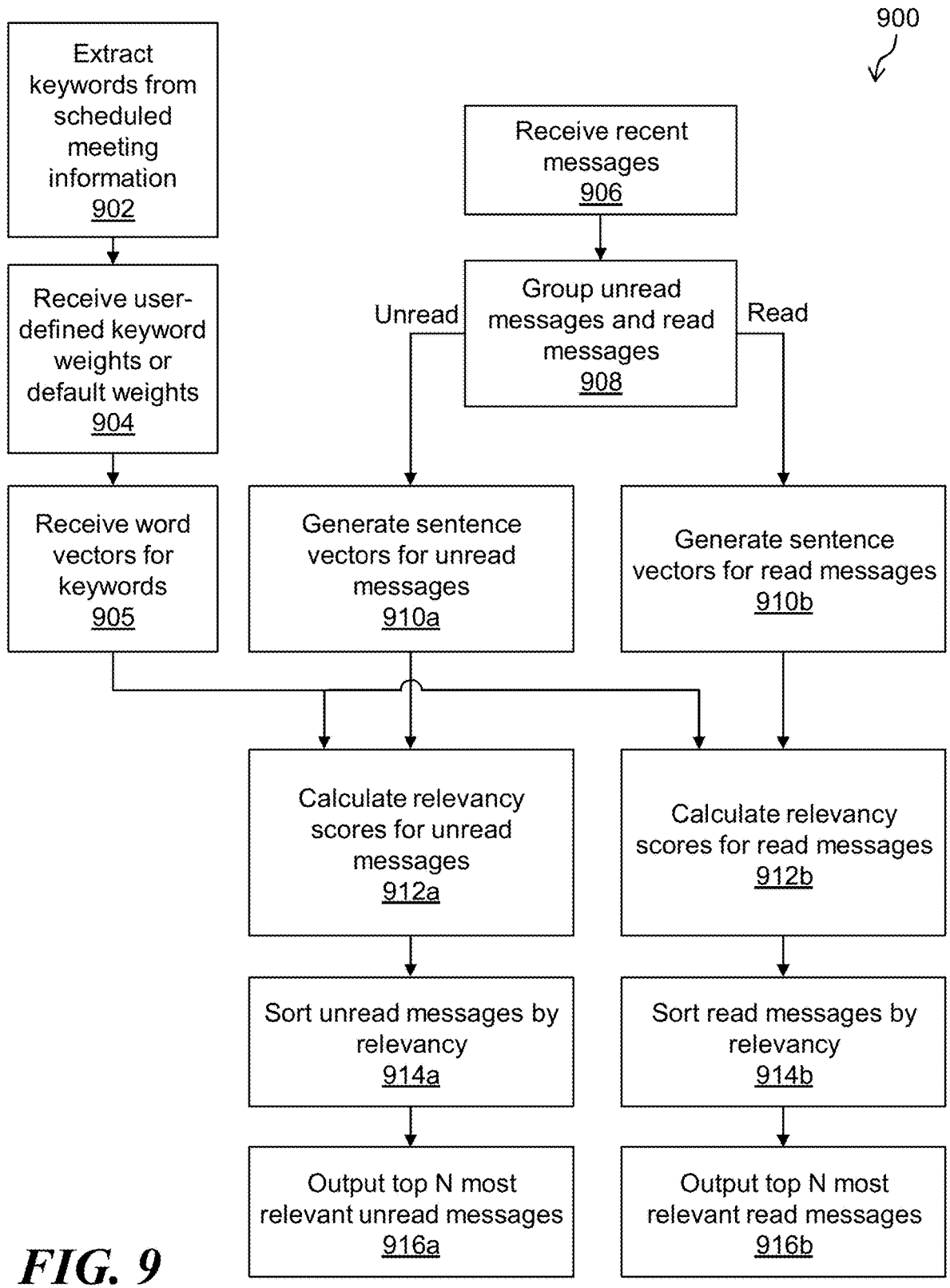

FIG. 9 shows another illustrative process 900 for intelligent collection of meeting information that can be implemented, for example, within a data processing service 508 of FIG. 5. More particularly, some or all of process 900 can be implemented with a ML engine, such as ML engine 516 of FIG. 5.

At block 902, one or more keywords can be extracted from the information stored for a meeting, such as the meeting's title or description. For example, the meeting's title can be split on words boundaries into a preliminary list of keywords, and then stop words may be filtered out to produce a list of meeting topics/keywords.

At block 904, weights may be received for the extracted keywords. The weights may be user-defined values (e.g., sent from a client to the data process service) or default values.

At block 905, trained word vectors may be received for the extracted keywords. For example, the ML engine may have access to a repository of trained word vectors (e.g., 300-dimension word vectors) corresponding to many different words in one or more different languages. The ML engine can generate a mapping from k extracted keywords $w_1, w_2, \ldots, w_k$, to corresponding k word vectors $v_{w1}, v_{w2}, \ldots, v_{wk}$ as follows:

$$\{w_1 : v_{w1}, w_2 : v_{w2}, \ldots, w_k : v_{wk}\}$$

At block 906, one or more recent messages can be received and, at block 908, the messages can be arranged into one or more groups. In the example shown, the messages are grouped by read status into a group of unread messages and a group of read messages.

At block 910a, sentence vectors (or "sample vectors") are generated for the unread messages. Similarly, at block 910b, sample vectors are generated for the read messages. In some embodiments, the sample vectors may be generated as 300-dimension vectors. A sample vector can be generated by first extracting a list of words from a message, obtaining trained word vectors for each extracted word, and then calculating an average of the word vectors. To extract the words from a message, the message's text content can be split on words boundaries and then stop words may be filtered out. If a message includes images or video, the images/video can be analyzed to extract any text content included therein (e.g., using optical character recognition or OCR).

For each extracted keyword, $w_i$, a trained word vector, $v_{w_i}$, can be obtained (e.g., from a repository of trained word vectors). For a list of s words extracted from a given message, a sample vector $v_s$ may be generated using the following algorithm, sometimes referred to as the sentence2vec algorithm:

$$v_s = \frac{1}{|s|} \sum_i^{|s|} \frac{a}{a + p(w_i)} v_{w_i}$$

where a is a constant (e.g., a parameter to the algorithm) and $p(w_i)$ is an estimated probability of word $w_i$. In some embodiments, $p(w_i)$ can be determined based on the number of times the word, $w_i$, appears in a sample. The ML engine can generate a mapping from the samples $s_1, s_2, \ldots$ to corresponding sample vectors $v_{s1}, v_{s2}, \ldots$ as follows:

$$\{s_1 : v_{s1}, s_2 : v_{s2}, \ldots\}$$

At bock 912a, relevancy scores can be calculated for the unread messages and, at block 912b, relevancy scores can be calculated for the read messages. To calculate the relevancy score for a given message, a cosine similarity can be calculated between the corresponding sample vector $v_s$ (generated at block 910a or 910b) and each of the k keyword word vectors $v_{w1}, v_{w2}, \ldots, v_{wk}$ as follows:

$$[COS(v_s, v_{w1}), COS(v_s, v_{w2}), \ldots, COS(v_s, v_{wk})]$$

Cosine similarity is a measure of similarity between two non-zero vectors of an inner product space. It is defined to equal the cosine of the angle between them, which is also the same as the inner product of the same vectors normalized to both have length one (1). The keyword weights, $h_1, h_2, \ldots, h_k$ can then be applied to calculate the relevancy score, $S_s$, as a weighted sum of the cosine similarities:

$$S_s = \Sigma_i^k COS(v_s, v_{wi}) \cdot h_i$$

Thus, the relevancy score is a function of the keyword weights that are adjustable by the user, as discussed previously.

At blocks 914a, the unread samples can be sorted by their calculated relevancy scores (e.g., in descending numerical order). Likewise, at block 914b, the read samples can be sorted by their calculated relevancy scores.

At block 916a, the top N most relevant unread messages can be output and, at block 916b, the top N most relevant read messages can be output. In some embodiments, different numbers of unread and read messages can be output. The messages may be output by the ML engine and sent to the meeting assistant agent running on a client.

The following examples pertain to further embodiments, from which numerous permutations and configurations will be apparent.

Example 1 includes a method including: receiving, by a first computing device, information about a meeting that a user is scheduled to attend; retrieving, by the first computing device, a plurality of messages sent to the user in one or more applications; analyzing, by the first computing device, the plurality of messages to identify one or more messages relevant to the meeting based on contents of the messages and the information received about the meeting; and sending, by the first computing device, the relevant messages to a second computing device, the second computing device configured to display the relevant messages to the user.

Example 2 includes the subject matter of Example 1, wherein receiving the information about the meeting includes receiving at least a title of the meeting from a calendaring service.

Example 3 includes the subject matter of Example 1 or 2, and further includes receiving a request for background information about the meeting, the request sent by the second computing device in response to a user input.

Example 4 includes the subject matter of any of Examples 1-3, and further comprising grouping the plurality of messages into a group of unread messages and a group of read messages, wherein analyzing the plurality of messages to identify the relevant messages includes: analyzing the group of unread messages to identify one or more unread messages relevant to the meeting, and analyzing the group of read messages to identify one or more read messages relevant to the meeting; and wherein the second computing device is configured to separately display the unread messages relevant to the meeting and the read messages relevant to the meeting.

Example 5 includes the subject matter of any of Examples 1-4, and further includes: extracting a one or more keywords from the information about the meeting; and receiving trained word vectors for the one or more keywords, wherein analyzing the plurality of messages to identify the relevant messages includes: for ones of the plurality of messages: generating a sentence vector based on contents of the message, calculating a similarity between the sentence vector and the trained word vectors; and identifying the one or more messages relevant to the meeting based on the calculated similarities.

Example 6 includes the subject matter of Example 5, wherein calculating the similarity between the sentence vector and the trained word vectors includes calculating a cosine similarity.

Example 7 includes the subject matter of Example 5 or 6, and further includes receiving one or more weights corresponding to the one or more keywords, wherein analyzing the plurality of messages to identify the relevant messages includes, for ones of the plurality of messages, calculating a relevancy score as a weighted sum of the calculated similarities using the one or more weights.

Example 8 includes the subject matter of any of Examples 5-7, wherein the one or more weights are received from the second computing device in response to an input.

Example 9 includes the subject matter of any of Examples 1-8, wherein the one or more applications include at least two of: an email application; a collaboration application; a product management application; and a social application.

Example 10 includes a system including a processor; and a non-volatile memory storing computer program code that when executed on the processor causes the processor to execute a process operable to: receive information about a meeting that a user is scheduled to attend; retrieve a plurality of messages sent to the user in one or more applications; analyze the plurality of messages to identify one or more messages relevant to the meeting based on contents of the messages and the information received about the meeting; and send the relevant messages to another computing device, the another computing device configured to display the relevant messages to the user.

Example 11 includes the subject matter of Example 10, wherein receiving the information about the meeting includes receiving at least a title of the meeting from a calendaring service.

Example 12 includes the subject matter of Example 10 or 11, wherein the process is further operable to receive a request for background information about the meeting, the request sent by the another computing device in response to a user input.

Example 13 includes the subject matter of any of Examples 10-12, wherein the process is further operable to group the plurality of messages sent to the user into a group of unread messages and a group of read messages, wherein analyzing the plurality of messages to identify the relevant messages includes: analyzing the group of unread messages to identify one or more unread messages relevant to the meeting, and analyzing the group of read messages to identify one or more read messages relevant to the meeting; and wherein the another computing device is configured to separately display the unread messages relevant to the meeting and the read messages relevant to the meeting.

Example 14 includes the subject matter of any of Examples 10-13, wherein the process is further operable to: extract a one or more keywords from the information about the meeting; and receive trained word vectors for the one or more keywords, wherein analyzing the plurality of messages to identify the relevant messages includes: for ones of the plurality of messages: generating a sentence vector based on contents of the message, calculating a similarity between the sentence vector and the trained word vectors; and identifying the one or more messages relevant to the meeting based on the calculated similarities.

Example 15 includes the subject matter of Example 14, wherein calculating the similarity between the sentence vector and the trained word vectors includes calculating a cosine similarity.

Example 16 includes the subject matter of Example 14 or 15, wherein the process is further operable to: receive one or more weights corresponding to the one or more keywords, wherein analyzing the plurality of messages to identify the relevant messages includes, for ones of the plurality of messages, calculating a relevancy score as a weighted sum of the calculated similarities using the one or more weights.

Example 17 includes the subject matter of Example 16, wherein the one or more weights are received from the another computing device in response to an input.

Example 18 includes the subject matter of any of Examples 10-17, wherein the one or more applications include at least two of: an email application; a collaboration application; a product management application; and a social application.

Example 19 includes a non-transitory computer readable medium storing program instructions that are executable to: receive, by a first computing device, information about a meeting that a user is scheduled to attend; retrieve, by the first computing device, a plurality of messages sent to the user in one or more applications; analyze, by the first computing device, the plurality of messages to identify one or more messages relevant to the meeting based on contents of the messages and the information received about the meeting; and send, by the first computing device, the relevant messages to a second computing device, the second computing device configured to display the relevant messages to the user.

Example 20 includes the subject matter of Example 19, wherein the program instructions are further executable to group the plurality of messages into a group of unread messages and a group of read messages, wherein analyzing the plurality of messages to identify the relevant messages includes: analyzing the group of unread messages to identify one or more unread messages relevant to the meeting, and analyzing the group of read messages to identify one or more read messages relevant to the meeting; and wherein the second computing device is configured to separately display the unread messages relevant to the meeting and the read messages relevant to the meeting.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
receiving, by a first computing device, information about a meeting that a user is scheduled to attend;
extracting, by a first computing device, a one or more keywords from the information about the meeting;
receiving, by a first computing device, trained word vectors for the one or more keywords;
retrieving, by the first computing device, a plurality of messages sent to the user in one or more applications;
analyzing, by the first computing device, the plurality of messages to identify one or more messages relevant to the meeting based on contents of the messages and the information received about the meeting; and
sending, by the first computing device, the relevant messages to a second computing device, the second computing device configured to display the relevant messages to the user,
wherein analyzing the plurality of messages to identify the relevant messages includes: for ones of the plurality of messages:
generating a sentence vector based on contents of the message,
calculating a similarity between the sentence vector and the trained word vectors, identifying the one or more messages relevant to the meeting based on the calculated similarities.

2. The method of claim 1, wherein receiving the information about the meeting includes receiving at least a title of the meeting from a calendaring service.

3. The method of claim 1, further comprising receiving a request for background information about the meeting, the request sent by the second computing device in response to a user input.

4. The method of claim 1, further comprising grouping the plurality of messages into a group of unread messages and a group of read messages,
wherein analyzing the plurality of messages to identify the relevant messages includes:
analyzing the group of unread messages to identify one or more unread messages relevant to the meeting, and
analyzing the group of read messages to identify one or more read messages relevant to the meeting; and
wherein the second computing device is configured to separately display the unread messages relevant to the meeting and the read messages relevant to the meeting.

5. The method of claim 1, wherein calculating the similarity between the sentence vector and the trained word vectors includes calculating a cosine similarity.

6. The method of claim 1, further comprising:
receiving one or more weights corresponding to the one or more keywords,
wherein analyzing the plurality of messages to identify the relevant messages includes, for ones of the plurality of messages, calculating a relevancy score as a weighted sum of the calculated similarities using the one or more weights.

7. The method of claim 6, wherein the one or more weights are received from the second computing device in response to an input.

8. The method of claim 1, wherein the one or more applications include at least two of:
an email application;
a collaboration application;

a product management application; and
a social application.

9. A system comprising:
a processor; and
a non-volatile memory storing computer program code that when executed on the processor causes the processor to execute a process operable to:
receive information about a meeting that a user is scheduled to attend;
extract a one or more keywords from the information about the meeting;
receive trained word vectors for the one or more keywords;
retrieve a plurality of messages sent to the user in one or more applications;
analyze the plurality of messages to identify one or more messages relevant to the meeting based on contents of the messages and the information received about the meeting; and
send the relevant messages to another computing device, the another computing device configured to display the relevant messages to the user,
wherein analyzing the plurality of messages to identify the relevant messages includes:
for ones of the plurality of messages:
generating a sentence vector based on contents of the message,
calculating a similarity between the sentence vector and the trained word vectors, and
identifying the one or more messages relevant to the meeting based on the calculated similarities.

10. The system of claim 9, wherein receiving the information about the meeting includes receiving at least a title of the meeting from a calendaring service.

11. The system of claim 9, wherein the process is further operable to receive a request for background information about the meeting, the request sent by the another computing device in response to a user input.

12. The system of claim 9, wherein the process is further operable to group the plurality of messages sent to the user into a group of unread messages and a group of read messages,
wherein analyzing the plurality of messages to identify the relevant messages includes:
analyzing the group of unread messages to identify one or more unread messages relevant to the meeting, and
analyzing the group of read messages to identify one or more read messages relevant to the meeting; and
wherein the another computing device is configured to separately display the unread messages relevant to the meeting and the read messages relevant to the meeting.

13. The system of claim 9, wherein calculating the similarity between the sentence vector and the trained word vectors includes calculating a cosine similarity.

14. The system of claim 9, wherein the process is further operable to:
receive one or more weights corresponding to the one or more keywords,
wherein analyzing the plurality of messages to identify the relevant messages includes, for ones of the plurality of messages, calculating a relevancy score as a weighted sum of the calculated similarities using the one or more weights.

15. The system of claim 14, wherein the one or more weights are received from the another computing device in response to an input.

16. The system of claim 9, wherein the one or more applications include at least two of:
an email application;
a collaboration application;
a product management application; and
a social application.

17. A non-transitory computer-readable medium storing program instructions that are executable to:
receive, by a first computing device, information about a meeting that a user is scheduled to attend;
extract, by a first computing device, a one or more keywords from the information about the meeting;
receive, by a first computing device, trained word vectors for the one or more keywords;
retrieve, by the first computing device, a plurality of messages sent to the user in one or more applications;
analyze, by the first computing device, the plurality of messages to identify one or more messages relevant to the meeting based on contents of the messages and the information received about the meeting; and
send, by the first computing device, the relevant messages to a second computing device, the second computing device configured to display the relevant messages to the user,
wherein analyzing the plurality of messages to identify the relevant messages includes:
for ones of the plurality of messages:
generating a sentence vector based on contents of the message,
calculating a similarity between the sentence vector and the trained word vectors, and
identifying the one or more messages relevant to the meeting based on the calculated similarities.

18. The computer-readable medium of claim 17, wherein the program instructions are further executable to group the plurality of messages into a group of unread messages and a group of read messages,
wherein analyzing the plurality of messages to identify the relevant messages includes:
analyzing the group of unread messages to identify one or more unread messages relevant to the meeting, and
analyzing the group of read messages to identify one or more read messages relevant to the meeting; and
wherein the second computing device is configured to separately display the unread messages relevant to the meeting and the read messages relevant to the meeting.

* * * * *